(12) United States Patent
Pottie

(10) Patent No.: US 10,408,117 B2
(45) Date of Patent: Sep. 10, 2019

(54) THERMOSTATIC VALVE

(71) Applicant: Vernet, Ollainville (FR)

(72) Inventor: Nicolas Pottie, Dampierre en Yvelines (FR)

(73) Assignee: VERNET, Ollainville (FR)

( * ) Notice: Subject to any disclaimer, the term of this patent is extended or adjusted under 35 U.S.C. 154(b) by 212 days.

(21) Appl. No.: 15/110,632

(22) PCT Filed: Jan. 8, 2015

(86) PCT No.: PCT/EP2015/050245
§ 371 (c)(1),
(2) Date: Jul. 8, 2016

(87) PCT Pub. No.: WO2015/104325
PCT Pub. Date: Jul. 16, 2015

(65) Prior Publication Data
US 2016/0333767 A1    Nov. 17, 2016

(30) Foreign Application Priority Data

Jan. 9, 2014   (FR) ...................... 14 50151

(51) Int. Cl.
*F01P 7/16*     (2006.01)
*F16K 31/02*    (2006.01)
(Continued)

(52) U.S. Cl.
CPC ................. *F01P 7/165* (2013.01); *F01P 7/16* (2013.01); *F16K 31/025* (2013.01);
(Continued)

(58) Field of Classification Search
CPC .... F16K 17/04; F16K 17/0413; F16K 17/048; F01P 7/165; F01P 2070/04; F01P 7/16; F01M 5/007; G05D 23/022; G05D 7/0133
(Continued)

(56) References Cited

U.S. PATENT DOCUMENTS 5,482,010 A * 1/1996 Lemberger .............. F01P 7/167
                                                              123/41.1
5,813,598 A * 9/1998 Kim ......................... F01P 11/18
                                                              236/34.5
(Continued)

FOREIGN PATENT DOCUMENTS

CN    101349187 A     1/2009
CN    102224367 A    10/2011
(Continued)

OTHER PUBLICATIONS

French Search Report, dated Sep. 19, 2014, for French Application No. FR 1450151, filed Jan. 9, 2014; 2 pages.
(Continued)

*Primary Examiner* — Christopher R Zerphey
*Assistant Examiner* — Schyler S Sanks
(74) *Attorney, Agent, or Firm* — Knobbe, Martens, Olson & Bear, LLP

(57) ABSTRACT

Provided herein is a valve with a housing, a thermostatic element of which a first end part of a piston, which axially opposes the end submerged in a thermodilatable material contained in the body of the thermostatic element, is secured to the housing; a return spring; an electrical heating resistance arranged inside the second end part of the piston; electrical connection for feeding the resistance from outside the housing; and a check mechanism for controlling a flow of fluid circulating through the housing, in a direction
(Continued)

leading from the first end part towards the second end part of the piston, and connected to the body of the thermostatic element such that the relative movements between the body and the piston, resulting from the dilation and contraction of the thermodilatable material, move the check mechanism in relation to the housing, between closed and open positions affecting the flow of fluid.

10 Claims, 3 Drawing Sheets

(51) Int. Cl.
G05D 23/02 (2006.01)
G05D 23/275 (2006.01)

(52) U.S. Cl.
CPC ..... G05D 23/022 (2013.01); G05D 23/27541 (2013.01); *F01P 2070/04* (2013.01)

(58) Field of Classification Search
USPC .............................................. 236/92 R, 34.5
See application file for complete search history.

(56) References Cited

U.S. PATENT DOCUMENTS

| 5,901,750 | A | * | 5/1999 | Kozinski | ................. | F16K 17/30 |
| | | | | | | 137/504 |
| 2002/0070367 | A1 | | 6/2002 | Friesenhahn et al. | | |
| 2009/0183696 | A1 | | 7/2009 | O'Flynn et al. | | |
| 2013/0140296 | A1 | * | 6/2013 | Mas | ........................ | H05B 3/44 |
| | | | | | | 219/534 |

FOREIGN PATENT DOCUMENTS

| CN | 203067075 U | 7/2013 | | |
| EP | 0 333 687 A2 | 9/1989 | | |
| EP | 2646667 B1 | 10/2013 | | |
| GB | 191108113 A1 | * 11/1911 | | |
| GB | 2 331 806 A | 6/1999 | | |
| WO | WO 2005-078255 A2 | 8/2005 | | |
| WO | WO 2012013896 A1 | * 2/2012 | ............... | H05B 3/44 |

OTHER PUBLICATIONS

International Search Report, dated May 27, 2015, for International Patent Application No. PCT/EP2015/050245, filed Jan. 8, 2015; 5 pages.

* cited by examiner

THERMOSTATIC VALVE

CROSS REFERENCE TO RELATED APPLICATIONS

This application is the U.S. National Stage application under 35 U.S.C. § 371 of International Application No. PCT/EP2015/050245, filed Jan. 8, 2015, designating the U.S. and published as WO 2015/104325 A1 on Jul. 16, 2015, which claims the benefit of French Patent Application No. FR 1450151, filed Jan. 9, 2014. Any and all applications for which a foreign or a domestic priority is claimed is/are identified in the Application Data Sheet filed herewith and is/are hereby incorporated by reference in their entirety under 37 C.F.R. § 1.57.

BACKGROUND

The present invention relates to a thermostatic valve. In some embodiments, the invention relates to the thermostatic valves that are used in cooling circuits of heat engines, in particular those of motor vehicles.

SUMMARY

The invention relates to thermostatic valves, whereof the body of the thermostatic element is fixedly secured to a sealing gate, the latter typically being mounted gripped around the body of the thermostatic element, and whereof the piston of the thermostatic element is, at its end opposite that submerged in the thermodilatable material contained in the body, securely fixed to the housing of the valve, using any appropriate means, while electrical wires or the like pass through the aforementioned end of the piston so as, from the outside of the housing, to rejoin the heating resistance. In this configuration, a stream of incoming fluid, going from the piston toward the body of the thermostatic element, necessarily causes an overpressure upstream from the sealing plug when this plug closes off the circulation of this stream of fluid through the housing of the valve, the sealing plug withstanding the overpressure under the action of a return spring associated with the thermostatic element. When, inopportunely or predictably and in certain usage cases, this overpressure reaches peaks such that the load of the spring is thwarted, the plug and the body of the thermostatic element, which is fixedly secured to the gate, are pushed by the stream of fluid, the body of the thermostatic element then descending on the piston: by friction between the body and the piston of the thermostatic element, the piston tends to be pulled jointly with the body and the gate, which causes the risk of making the fastening of the end of the piston to the housing and/or the electrical wires passing through the end of the piston fragile, or even damaging them.

BRIEF DESCRIPTION OF THE DRAWINGS

The invention will be better understood upon reading the following description, provided solely as an example and done in reference to the drawings, in which

FIG. 1 shows an embodiment of a longitudinal sectional view of a functional configuration of a thermostatic valve according to the present invention.

FIG. 2 shows an embodiment of a longitudinal sectional view of a functional configuration of a thermostatic valve according to the present invention.

FIG. 3 shows an embodiment of a longitudinal sectional view of a functional configuration of a thermostatic valve according to the present invention.

DETAILED DESCRIPTION

Figure 1:
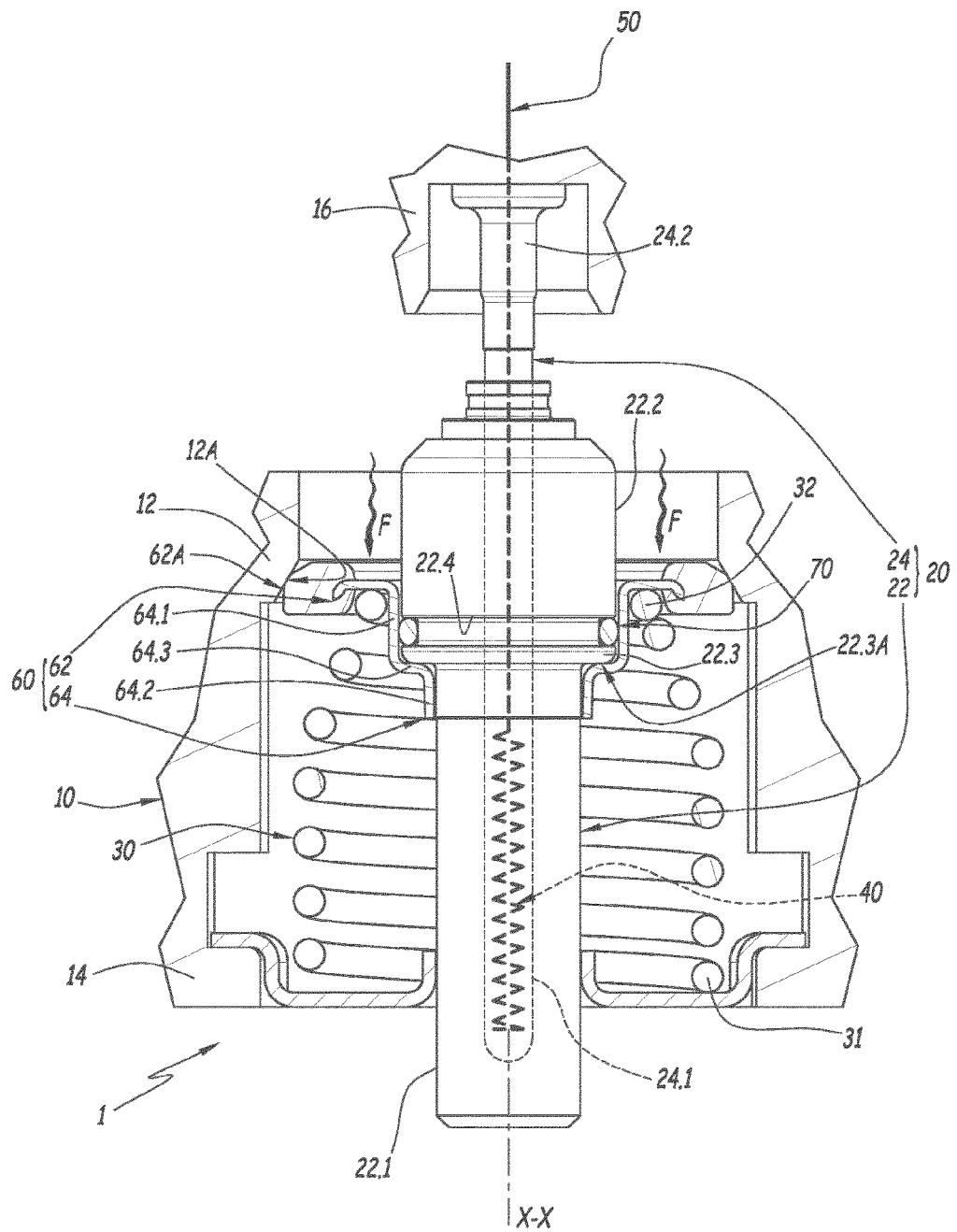
FIGS. 1 to 3 are a longitudinal sectional view of a thermostatic valve according to the invention, illustrating three different functional configurations.

In many applications in the fluid field, in particular for cooling vehicle heat engines, thermostatic valves are used to distribute an incoming fluid in different circulation pathways, based on the temperature of that fluid. These valves are said to be thermostatic inasmuch as the movement of their inner seal(s) is controlled by a thermostatic element, i.e., an element that comprises a body, containing a thermodilatable material, and a piston, submerged in this thermodilatable material, the body and the piston being movable relative to one another in translation along the longitudinal axis of the piston. To distribute the fluid as a function of other parameters, in particular conditions outside the valve, such as the ambient temperature or the load of the vehicle propelled by the engine equipped with the valve, it is known to incorporate an electric heating resistance, arranged inside the piston of the thermostatic element, into the valve, to heat the thermodilatable material, which makes it possible to control the valve from the outside, independently of or in addition to the temperature of the incoming fluid, in particular using an onboard computer of the vehicle programmed appropriately.

Document WO-A-2005/078255 discloses a thermostatic valve incorporating a thermal safety function. In this valve, a gate, the movements of which are normally controlled by the moving part of the thermostatic element, is movable relative to this part when the temperature of the fluid to be regulated is too high, owing to the deterioration of an interface made from a eutectic alloy, inserted between the plug and a part fixedly attached on the moving part of the thermostatic element.

The aim of the present invention is to propose a thermostatic valve of the aforementioned type that is improved inasmuch as it is protected from overpressure peaks upstream from its sealing gate.

To that end, the invention relates to a thermostatic valve, including:
a housing,
a thermostatic element that comprises both a body, containing a thermodilatable material, and a piston, which piston is thermally conductive, extends lengthwise along an axis, includes a first terminal part that is fixedly secured to the housing, and also includes a second terminal part that is axially opposite the first terminal part and that is submerged in the thermodilatable material, such that the body and the piston are movable relative to one another along the axis, moving away from one another under the action of an expansion of the thermodilatable material,
a return spring that is suitable for bringing the body and the piston of the thermostatic element closer to one another during a contraction of the thermodilatable material,
a heating electric resistance, which is arranged inside the second terminal part of the piston of the thermostatic element,
an electric conductor, which is suitable for supplying electricity to the resistance from outside the housing and that extends from the resistance to the outside of the piston, via the first terminal part of the piston, and a plug:

that is suitable for controlling a fluid flow circulating, through the housing, in a direction oriented from the first terminal part to the second terminal part of the piston, that is connected to the body of the thermostatic element such that the relative movement between the body and the piston of the thermostatic element, resulting from the expansion and contraction of the thermodilatable material, move the plug relative to the housing between a closing off position with respect to the fluid flow and an open position with respect to the fluid flow, and that is mounted on the body of the thermostatic element movably along the axis such that, as long as the pressure of the fluid flow upstream from the plug is below a predetermined threshold value, the plug is stationary relative to that body under the action of the return spring, whereas when the pressure of the fluid flow upstream from the plug exceeds the threshold value, the plug moves axially along the body while supporting the action of the return spring.

One of the ideas at the base of the invention is to challenge the traditional assembly of the sealing plug on the body of the thermostatic element, this traditional assembly typically being a tight fitting of the plug around this body, which has the well-known advantages of substantially limiting the passage leak at the contact interface between the plug and the body of the thermostatic element, as well as reducing the vibrations of the thermostatic element "cold", i.e., when its piston is more pushed into the body than the side at which the deployment of the piston relative to the body begins to drive the movement of the plug relative to the housing of the valve. Thus, contrary to this technical prejudice regarding the fixed assembly of the plug on the body of the thermostatic element, the invention proposes to leave the plug movable, in the longitudinal axis of the piston of the thermostatic element, on the body of the thermostatic element, this mobility, typically translational, nevertheless being implemented only in case of overpressure peaks upstream from the gate. Thus, when the pressure upstream from the plug remains below a predetermined threshold value, the fixed connection between the plug and the body of the thermostatic element is maintained under the action of the return spring associated with the thermostatic element, the load of this spring opposing the pressure of the fluid upstream from the gate. When the pressure upstream from the plug increases until it overcomes the load of the return spring, only the plug is pushed axially back in the direction of the fluid stream, while sliding around the body of the thermostatic element, which in turn remains stationary relative to the housing and therefore does not cause any stress, in particular traction, on the piston of the thermostatic element. The securing between the piston and the housing, irrespective of the embodiment of this securing, is thus not made fragile. The thermostatic valve according to the invention has a simple design, avoiding the addition of a specific overpressure spring, since the deballasting of the overpressure peaks is obtained by moving the "primary" regulating gate. The bulk and manufacturing cost of the thermostatic valve according to the invention are substantially identical to those of a thermostatic valve of the prior art. In particular, according to one embodiment of the invention, no specific arrangement of the body of the thermostatic element is necessary: in other words, the invention may be implemented with a pre-existing thermostatic element. According to another embodiment, the sliding contact interface between the plug and the body of the thermostatic element is made tight, subject to specific arrangements, which will be described in more detail below.

According to additional advantageous features of the thermostatic valve according to the invention:

The plug is mounted on the body of the thermostatic element such that, while the resistance is substantially inactive:
  as long as the pressure from the fluid flow upstream from the plug is below the threshold value, the plug occupies, relative to the housing, its closing off position and is fixedly maintained in a position relative to the body of the thermostatic element under the action of the return spring, while
  when the pressure from the fluid flow upstream from the plug exceeds the threshold value, the plug leaves its closing off position relative to the housing, moving along the body of the thermostatic element.

The plug is mounted coaxially in sliding adjustment around the body of the thermostatic element.

The body of the thermostatic element is provided with a bearing zone, against which the plug is axially pressed by the return spring when the pressure from the fluid flow upstream from the plug is below the threshold value, and from which the plug moves axially away when the pressure from the fluid flow upstream from the plug is above the threshold value.

The body of the thermostatic element includes a hub for storing the thermodilatable material, which, in the direction opposite the direction of the fluid flow, is extended by a collar of the body, the hub and the collar being connected to one another by a shoulder that protrudes from the hub toward the outside of the latter and defines the bearing zone.

The thermostatic valve further includes a sealing gasket inserted between the plug and the body of the thermostatic element so as to substantially seal the contact between them.

The sealing gasket is a toroid.

The sealing gasket is inserted substantially radially to the axis between the plug and the body of the thermostatic element.

The body of the thermostatic element is provided with a bearing zone, against which the plug is axially pressed by the return spring when the pressure from the fluid flow upstream from the plug is below the threshold value, and from which the plug moves axially away when the pressure from the fluid flow upstream from the plug is above the threshold value; the body of the thermostatic element includes a hub for storing the thermodilatable material, which, in the direction opposite the direction of the fluid flow, is extended by a collar of the body, the hub and the collar being connected to one another by a shoulder that protrudes from the hub toward the outside of the latter and defines the bearing zone; and the collar of the body of the thermostatic element is provided with a peripheral groove for receiving the sealing gasket.

The thermostatic valve has no sealing pieces added between the plug and the body of the thermostatic element.

Figure 2:
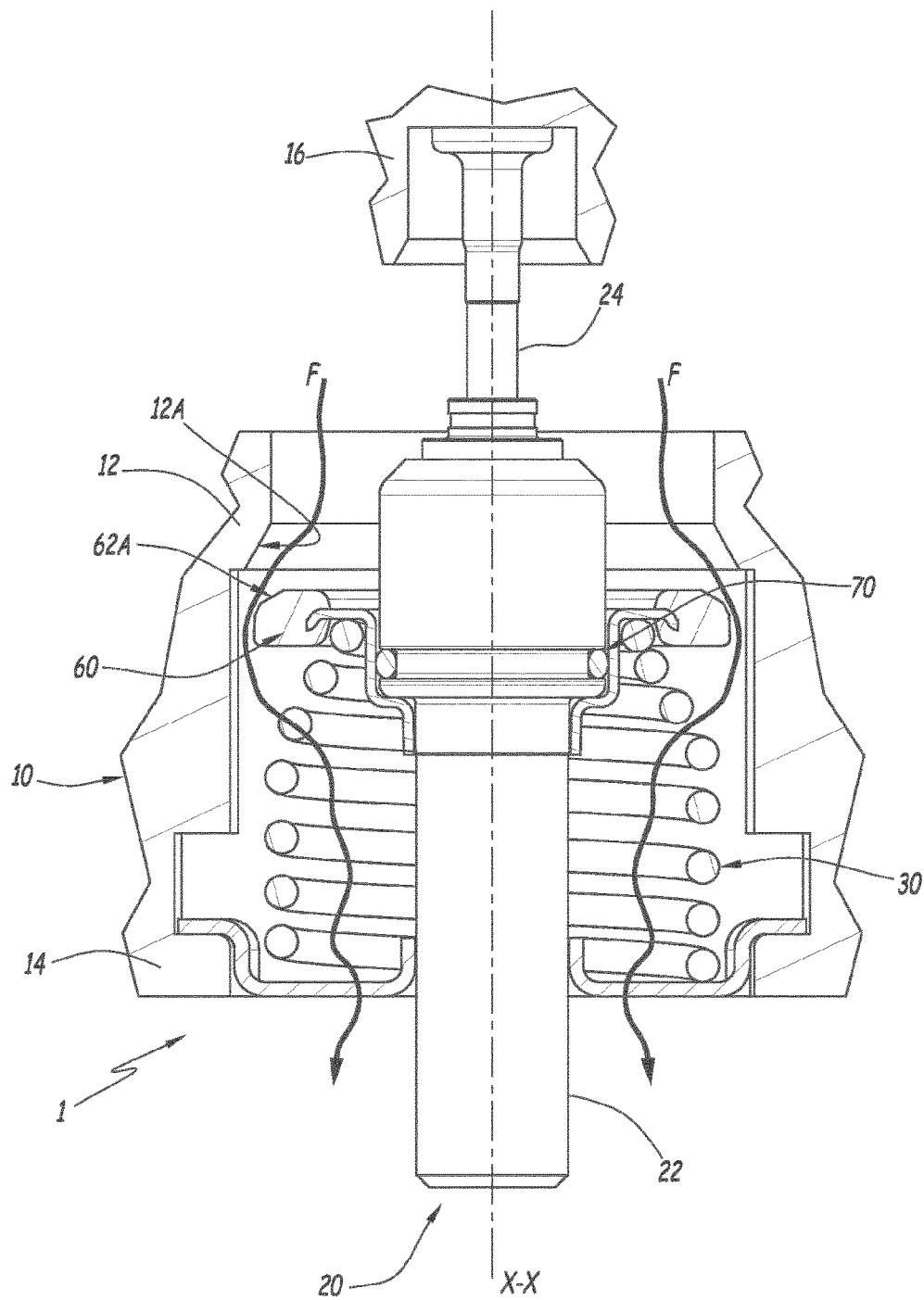
Figure 3:
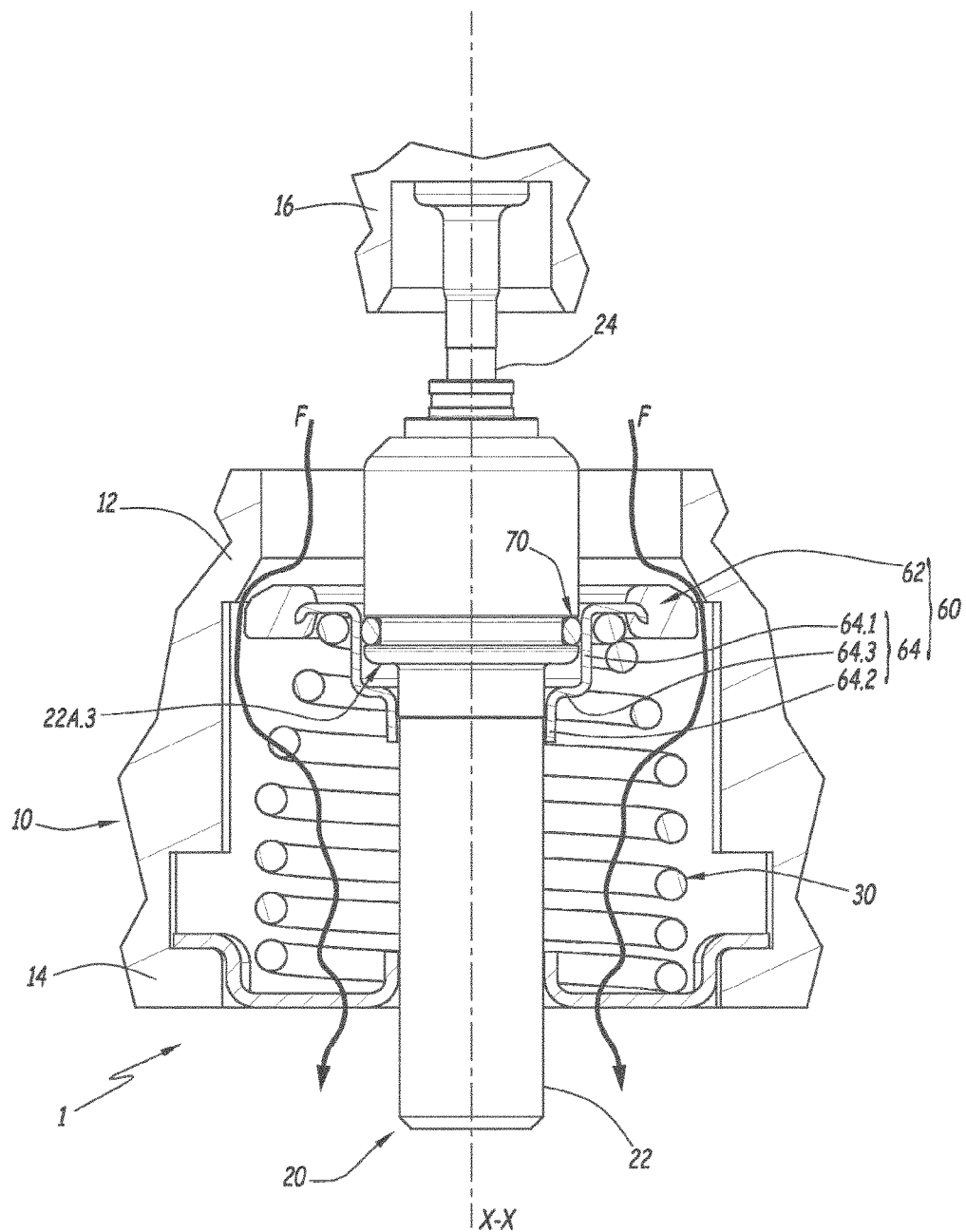

FIGS. 1 to 3 show a thermostatic valve 1 intended to regulate the circulation of the fluid, in particular a coolant liquid circulating within a cooling circuit of a heat engine.

The valve 1 includes a housing 10, which is for example made from a plastic or metal alloy material, and which is designed to keep the other components of the valve 1 assembled to one another, while allowing the fluid the possibility of circulating through the housing 10, while forming a stream of fluid F regulated by the other components of the valve 1.

The housing 10 includes a tubular body 12, which is centered on a geometric axis X-X in the direction of which the stream of fluid F flows when the latter crosses inwardly through the tubular body 12, as shown in the figures. This circulation of the stream of fluid F is oriented in the direction where the stream of fluid F crosses inwardly through the tubular body 12 of the housing 10 in a predetermined direction, i.e., from top to bottom in the figures.

The valve 1 also includes a thermostatic element 20 that is centered on the axis X-X. More specifically, the thermostatic element 20 includes a body 22, centered on the axis X-X and containing a thermodilatable material such as a wax. The thermostatic element 20 also comprises a piston 24, the longitudinal geometric axis of which is aligned on the axis X-X within the valve 1. A terminal axial part 24.1 of the piston 24, which corresponds to the downstream terminal part of said piston in the direction of the fluid stream F, is submerged in a thermodilatable material contained in the body 22. In the assembled state, the body 22 and the piston 24 are movable relative to one another in translation along the axis X-X: under the effect of the expansion of the thermodilatable material contained in the body 22, the piston 24 deploys outside the body, while, during a contraction of the thermodilatable material, the piston retracts inside the body under the return effect of a compression spring 30 that is functionally inserted between the body of the thermostatic element and the housing 10. In the example embodiments considered in the figures, the spring 30 is substantially centered on the axis X-X and its end turn 31, opposite its end turn 32 acting on the body 22 of the thermostatic element, in other words, its end turn 31 downstream in the direction of the fluid stream bears on a rigid framework 33 that is secured to a downstream part 14 of the housing 10 by arrangements known in themselves and therefore not outlined here.

In the assembled state of the valve 1, the piston 24 of the thermostatic element 20 is fixedly secured to the housing 10. More specifically, in a manner known in itself, the upstream terminal part 24.2 of this piston 24 is permanently fixed to an upstream part 16 of the housing 10, arranged across the axis X-X. In practice, various embodiments can be considered regarding the permanent securing of the terminal part 24.2 of the piston 24 to the housing part 16: this securing can be done by fitting, or by overmolding, or by the addition of a mechanical maintaining system, etc. In all cases, it will be understood that, when the thermodilatable material of the body 22 of the thermostatic element 20 expands, contracts, respectively, the piston 24 is kept immobile relative to the housing 10, due to the fastening of the upstream terminal part 24.2 to that housing, while the body 22 moves away from, comes closer to, respectively, the piston 24 relative to the housing 10, translated along the axis X-X in the direction of the fluid stream F, in the opposite direction, respectively.

The valve 1 further includes a heating electric resistance 40, as well as electrical wires 50 supplying electricity to the resistance 40 from outside the housing 10, these wires connecting the resistance 40 to a current source, outside the valve 1, not shown. In a manner known in itself, the resistance 40 is arranged inside the downstream terminal part 24.2 of the piston 24 of the thermostatic element 20, so that this resistance can heat the thermodilatable material contained in the body 22 of the thermostatic element. To that end, the piston 24 is made, at least regarding its downstream terminal part 24.1, from a thermally conductive material, typically metal. In practice, various other embodiments can be considered regarding the heating resistance 40, this resistance being symbolized, in FIG. 1, by a zigzag line, this diagrammatic illustration not limiting the present invention. Likewise, the embodiment of the wires 50 does not limit the invention, inasmuch as these wires can be made by any electric conductor, connecting the resistance 40 to the aforementioned outside current source, having nevertheless noted that, irrespective of their embodiment, these wires 50 extend, from the resistance 40 to the outside of the housing 10, passing through the upstream terminal part 24.2 of the piston 24 and thus at least partially crossing through the upstream part 16 of the housing 10, as diagrammatically indicated in FIG. 1.

The valve 1 further includes a sealing plug 60 having a tubular global shape which, in the assembled state of the valve 1, is substantially centered on the axis X-X.

In its peripheral part 62 turned radially opposite the axis X-X, the plug 60 defines a peripheral surface 62A which, during use, is provided to cooperate with a seat 12A inwardly defined by the tubular body 12 of the housing 10: in the assembled state of the valve 1, when the surface 62A is pressed in tight contact against the seat 12A, the plug 60 prohibits the circulation of the fluid between the plug and the body 12 of the housing 10, closing off the passage for the fluid stream F through the housing 10 and keeping that fluid stream F only on the upstream side of the plug 60, as in the configuration shown in FIG. 1, while, when the surface 62A is separated from the seat 12A, the fluid stream F flows, from upstream from the plug 60, between said plug and the tubular body 12 of the housing 10, thus crossing through the housing, as shown in FIGS. 2 and 3.

In practice, the tight contact surface 62A and/or the seat 12A can be made directly by the peripheral part 62 of the plug 60 and/or the tubular body 12 of the housing 10, respectively, or on the contrary, the peripheral part 62 of the plug 60 and/or the body 12 of the housing 10 can, to that end, be provided with a tight fitting, for example attached by overmolding.

In its peripheral part 64 turned radially toward the axis X-X, the plug 60 is assembled on the body 22 of the thermostatic element 20. More specifically, in the example embodiment considered in the figures, this peripheral part 64 of the plug 60 has a stepped annular shape, which is centered on the axis X-X and which includes, successively in the direction of the axis X-X, an upstream ring 64.1 and a downstream ring 64.2, connected to one another by a shoulder 64.3 protruding from the downstream ring 64.2 toward the outside of the latter. This peripheral part 64 of the plug 60 is mounted on the body 22 of the thermostatic element movably along the axis X-X: the downstream ring 64.2 of the plug 60 is mounted coaxially and in sliding adjustment around a hub 22.1 of the body 22, containing the thermodilatable material of that body, and the upstream ring 64.1 inwardly receives a complementary collar 22.2 of the body 22, said collar 22.2 extending, in the direction opposite the direction of the stream of fluid F, the hub 22.1 of that body. The hub 22.1 and the collar 22.2 of the body 22 of the thermostatic element 20 are connected to one another by a shoulder 22.3, which protrudes from the hub 22.1 toward the outside of the latter and defines a zone 22.3A against which the shoulders 64.3 of the plug 60 can be pressed axially in the direction opposite the direction of the fluid stream F.

In the assembled state of the valve 1, the spring 30 acts on the plug 60, in return for the bearing of its upstream end turn 32 on the downstream side of the plug 60, so as to axially press by bearing, in the direction opposite that of the fluid stream F, the shoulder 64.3 of the plug 60 against the shoulder 22.3 of the body 22, more specifically against the bearing zone 22.3A of the latter. In other words, more generally, as long as the action of the spring 30 on the plug 60 is not supported by the plug itself, this plug 60 is stationary relative to the body 22 of the thermostatic element 20, here by axial bearing against the bearing zone 22.3A of this body 22: as long as the spring 30 keeps the plug 60 fixedly in position relative to the body 22 of the thermostatic element, the relative movements between the body and the piston 24 of the thermostatic element command corresponding movements of the plug 60 relative to the housing 10, the plug then being movable, by driving of the body 22 relative to the piston 24 and therefore relative to the housing 10 to which this piston is fixedly secured, between a closing off position, which is shown in FIG. 1 and in which the surface 62A of the plug 60 is tightly bearing against the seat 12A of the housing 10, and an open position, which is shown in FIG. 2 and in which the surface 62A is separated from the seat 12A. Of course, inasmuch as, when the plug 60 is in its sealing position of FIG. 1, the fluid stream F is kept upstream from the plug 60, without reaching the hub 22.1 of the body of the thermostatic element, the heating of the thermodilatable material contained in the hub 22.1, necessary for the expansion of this material and therefore the separation of the body 22 relative to the piston 24 of the thermostatic element, is to be controlled by the activation of the heating resistance 40.

Furthermore, irrespective of the position of each body 22 of the thermostatic element 20 relative to the housing 10, including its position of FIG. 1 corresponding to the sealing position for the plug 60, the plug 60 remains free to slide axially along the body 22 of the thermostatic element 20 in the direction of the fluid stream F. This sliding occurs when the pressure from the fluid stream F, upstream from the gate, is above a predetermined threshold value, depending on the load of the spring 30: indeed, when the pressure from the fluid stream F upstream from the plug 60 exceeds the aforementioned threshold value so as to support the action of the spring 30 on the gate, the latter moves axially along the body 22 under the action of this pressure from the fluid stream F, here by sliding of its downstream ring 64.2 around the hub 22.1 of the body of the thermostatic element. Thus, in case of overpressure peaks on the upstream side of the plug 60, the latter goes, for example, from its sealing position of FIG. 1 to the deballasting position of FIG. 3, in which its surface 62A is separated from the seat 12A to allow the passage of the fluid stream F in the downstream direction of the gate, without moving the body 22 of the thermostatic element 20 relative to the housing. It is therefore understood that the valve 1 is protected from overpressure peaks upstream from the gate.

Advantageously, the valve assembly 1 is provided so that, cold, i.e., when the heating resistance 40 is inactive or not active enough to cause a non-negligible extension of the thermodilatable material, the spring 30 acts on the plug 60 so as on the one hand to press its surface 62A bearing tightly against the seat 12A of the housing 10 and press, by bearing, its shoulder 64.3 against the zone 22.3A of the body 22 of the thermostatic element: in this way, while the pressure from the fluid stream F upstream from the plug 60 is below the aforementioned threshold value, the plug 60 occupies its sealing position relative to the housing 10 when the valve is cold and the plug moves away from this sealing position to allow the passage of the fluid stream F toward the downstream direction of the plug once the resistance 40 is activated, without the beginning of the separation of the body 22 with respect to the piston 24, resulting from the expansion of the thermodilatable material, having to make up a residual axial play between the shoulders 22.3 and 64.3.

According to one optional arrangement, which is implemented in the embodiment considered in the figures, the valve 1 also includes a sealing gasket 70 that is inserted between the plug 60 and the body 22 of the thermostatic element 20 so as to seal the contact between the plug and the body of the thermostatic element, at least as long as the pressure from the fluid stream F upstream from the plug 60 is below the aforementioned threshold value. In this way, in all of the usage configurations of the valve 1, or at the very least, as long as the plug 60 is stationary relative to the body 22 of thermostatic element 20, the fluid stream F is prevented from flowing downstream from the plug by passing between the plug and the body 22 of the thermostatic element, to within a leakage allowance. Advantageously, this sealing gasket 70 is a toroid. Furthermore, so as not to cause an axial position shift between the plug 60 and the body 22 of the thermostatic element 20, this sealing gasket is advantageously inserted exclusively radially between the plug and the body of the thermostatic element: thus, in the example embodiment considered in the figures, this seal 70 is received in a peripheral groove 22.4 hollowed in the outer face of the collar 22.2 of the body 22, found radially inserted between the bottom of this groove 22.4 and the upstream ring 64.1 of the plug 60.

In all cases, the presence of the sealing gasket 70, inserted between the plug 60 and the body 22 of the thermostatic element 20, damps and/or reacts the vibrations and small surging movements of the body 22 of the thermostatic element 20, in particular relative to the piston 24 when the thermostatic element is cold.

According to another embodiment, which is not shown in the figures, the sealing gasket 70 described above may be omitted: generally, in this alternative embodiment that is not shown, the valve 1 has no sealing means added between the plug 60 and the body 22 of the thermostatic element 20. It will be understood that, in this case, the sealing threshold at the assembly interface between the plug 60 and the body 22 of the thermostatic element 20 is not severe, since a fluid leak downstream from the plug 60 is tolerated irrespective of the position of the plug relative to the housing, including in its sealing position of FIG. 1. The interest of this alternative embodiment lies in being able to use, as thermostatic element 20, a pre-existing thermostatic element, since no development of its body 22 is necessary for the mobile assembly of the plug 60 around this body 22: indeed, many pre-existing thermostatic elements include a shoulder similar to the shoulder 22.3 shown in the figures, connecting a hub of said pre-existing thermostatic element, similar to the hub 22.1 shown in the figures, to a collar that corresponds to the collar 22.2 shown in the figures, with the difference that it does not include the groove 22.4.

Various arrangements and alternatives of the valve 1 may also be considered. For example, in a manner known itself, the body 22 may be extended on the side opposite the piston 24, by a rod movably bearing a sealing member other than the plug 60, in order to control the regulation of the circulation of the fluid supplying the valve in a channel other than that regulated by the gate, in particular to perform a bypass function within a cooling circuit of an engine.

The invention claimed is:

1. A thermostatic valve, comprising:
a housing;
a thermostat that comprises both a body, containing a thermodilatable material, and a piston, wherein the piston is thermally conductive, extends lengthwise along an axis, comprises a first terminal part that is fixedly secured to the housing, and also comprises a second terminal part that is axially opposite the first terminal part and that is submerged in the thermodilatable material, such that the body is movable relative to the piston along the axis, moving away from the piston during an expansion of the thermodilatable material and moving closer to the piston during a contraction of the thermodilatable material;
an electric resistance heater, which is arranged inside the second terminal part of the piston;
an electrical conductor, which is suitable for supplying electricity to the resistance heater from outside the housing and which extends from the resistance heater to the outside of the piston, via the first terminal part of the piston;
a plug, wherein the plug:
is suitable for controlling a fluid flow circulating, through the housing, in a direction oriented from the first terminal part to the second terminal part of the piston,
is movable relative to the housing between a closing off position in which the plug closes off the fluid flow and an open position in which the plug lets the fluid flow through, the closing off position and the open position being successive in said direction of the fluid flow, and
is mounted on the body movably along the axis; and
a single return spring that is interposed between the plug and the housing such that:
when the thermodilatable material expands, the return spring is compressed by the plug that is moved to the open position by the body moving away from the piston,
when the thermodilatable material contracts, the return spring releases and thereby moves both the plug to the closing off position and the body closer to the piston,
when fluid upstream from the plug has a pressure that is below a predetermined threshold value, the return spring axially fixes the plug on the body irrespective of position of the body along the axis relative to the housing, and
when fluid upstream from the plug has a pressure that exceeds the threshold value, the return spring is counteracted by the plug that moves axially on the body in said direction of the fluid flow irrespective of position of the body along the axis relative to the housing.

2. The thermostatic valve according to claim 1, wherein the plug is mounted on the body such that:
when the resistance heater is substantially inactive and when fluid upstream from the plug has a pressure that is below the threshold value, the plug occupies the closing off position and is fixedly maintained on the body by the return spring, whereas
when the resistance heater is substantially inactive and when fluid upstream from the plug has a pressure that exceeds the threshold value, the plug leaves the closing off position, moving along the body in said direction of fluid flow.

3. The thermostatic valve according to claim 1, wherein the plug is mounted coaxially in sliding adjustment around the body.

4. The thermostatic valve according to claim 1, wherein the body is provided with a bearing zone, and wherein, irrespective of position of the body along the axis relative to the housing, the plug is axially pressed by the return spring when the pressure of fluid upstream from the plug is below the threshold value, and the plug moves axially away from the bearing zone in said direction of the fluid flow when the pressure of fluid upstream from the plug is above the threshold value.

5. The thermostatic valve according to claim 4, wherein the body comprises, successively in said direction of the fluid flow, a collar and a hub that stores the thermodilatable material, the hub and the collar being connected to one another by a shoulder that protrudes from the hub toward outside of the hub and defines the bearing zone.

6. The thermostatic valve according to claim 1, wherein the thermostatic valve further comprises a sealing gasket inserted between the plug and the body so as to substantially seal therebetween.

7. The thermostatic valve according to claim 6, wherein the sealing gasket is a toroid.

8. The thermostatic valve according to claim 6, wherein the sealing gasket is inserted substantially radially to the axis between the plug and the body.

9. The thermostatic valve according to claim 6,
wherein the body is provided with a bearing zone;
wherein, irrespective of position of the body along the axis relative to the housing, the plug is axially pressed against the bearing zone by the return spring when the pressure of fluid upstream from the plug is below the threshold value, and the plug moves axially away from the bearing zone in said direction of the fluid flow when the pressure of fluid upstream from the plug is above the threshold value;
wherein the body comprises, successively in said direction of the fluid flow, a collar and a hub that stores the thermodilatable material, the hub and the collar being connected to one another by a shoulder that protrudes from the hub toward outside of the hub and defines the bearing zone; and
wherein the collar of the body is provided with a peripheral groove for receiving the sealing gasket.

10. The thermostatic valve according to claim 1, wherein the thermostatic valve has no sealing pieces added between the plug and the body.

* * * * *